(12) United States Patent
Kim et al.

(10) Patent No.: US 8,835,059 B2
(45) Date of Patent: *Sep. 16, 2014

(54) LITHIUM RECHARGEABLE BATTERY, AND SEPARATOR FOR LITHIUM RECHARGEABLE BATTERY

(75) Inventors: Jin-Hee Kim, Yongin-si (KR); Won-Chull Han, Yongin-si (KR); Jae-Yun Min, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 1796 days.

This patent is subject to a terminal disclaimer.

(21) Appl. No.: 11/480,529

(22) Filed: Jul. 5, 2006

(65) Prior Publication Data
US 2007/0009803 A1    Jan. 11, 2007

(30) Foreign Application Priority Data
Jul. 6, 2005 (KR) .......................... 10-2005-060624

(51) Int. Cl.
*H01M 2/16* (2006.01)
*H01M 10/0525* (2010.01)
*H01M 2/14* (2006.01)

(52) U.S. Cl.
CPC .......... *H01M 2/166* (2013.01); *H01M 2220/30* (2013.01); *H01M 2/145* (2013.01); *H01M 2/1673* (2013.01); *H01M 10/0525* (2013.01); *Y02E 60/12* (2013.01)
USPC .......................................... 429/251; 429/254

(58) Field of Classification Search
CPC ..... H01M 10/52; H01M 10/525; H01M 2/16; H01M 2/14; H01M 2/166; H01M 2/1673; H01M 2/145; H01M 10/052; H01M 10/0525

USPC .......................................... 429/249, 251, 254
See application file for complete search history.

(56) References Cited

U.S. PATENT DOCUMENTS

| | | | |
|---|---|---|---|
| 5,998,063 A | 12/1999 | Kobayashi et al. | |
| 6,011,939 A | 1/2000 | Martin | |
| 6,080,507 A * | 6/2000 | Yu | 429/145 |
| 6,096,456 A * | 8/2000 | Takeuchi et al. | 429/249 |
| 6,287,720 B1 * | 9/2001 | Yamashita et al. | 429/131 |
| 6,949,285 B1 * | 9/2005 | Tobinaga et al. | 429/251 |
| 2003/0113626 A1 * | 6/2003 | Maeda et al. | 429/217 |

FOREIGN PATENT DOCUMENTS

| | | |
|---|---|---|
| JP | 11-080395 | 3/1999 |
| JP | 11213980 | 8/1999 |
| JP | 200056614 A | 2/2000 |
| JP | 2005123047 A | 5/2005 |

(Continued)

OTHER PUBLICATIONS

"Polymethyl methacrylate (PMMA)." Encyclopædia Britannica. Encyclopædia Britannica Online. Encyclopædia Britannica, 2011. Web. Jun. 13, 2011. <http://www.britannica.com/EBchecked/topic/1551203/polymethyl-methacrylate>.*

*Primary Examiner* — Edu E Enin-Okut
(74) *Attorney, Agent, or Firm* — Robert E. Bushnell, Esq.

(57) ABSTRACT

A lithium rechargeable battery, which includes a separator having excellent mechanical strength such as elastic strength, swelling resistance, heat resistance, and peel strength. The lithium rechargeable battery includes a cathode, an anode, a separator for separating both electrodes from each other, and a non-aqueous electrolyte, wherein the separator includes a porous membrane formed of a ceramic material and a binder, and the binder has an elongation ratio of 200 to 300%.

35 Claims, 1 Drawing Sheet

(56) References Cited

FOREIGN PATENT DOCUMENTS

| KR | 10-2001-0037100 | 5/2001 | |
| KR | 2002-0080797 | 10/2002 | |
| KR | 10-2002-0096302 | 12/2002 | |
| KR | 10-2004-0108525 | 12/2004 | |
| WO | WO 2005011043 A1 * | 2/2005 | ............ H01M 10/40 |

* cited by examiner

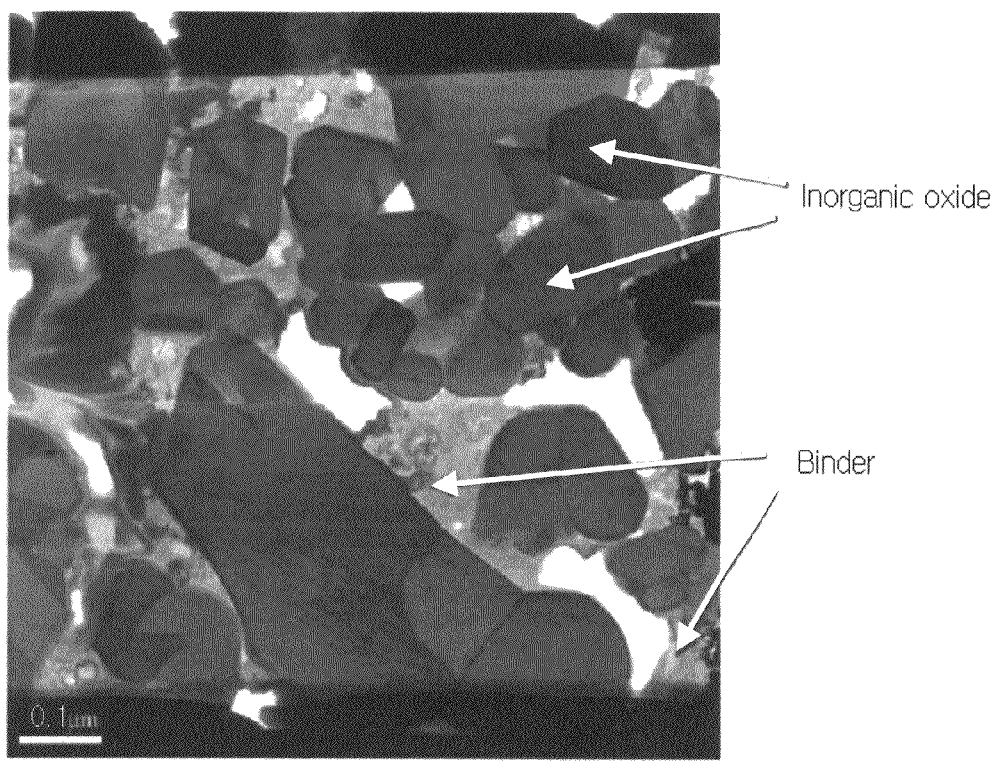

LITHIUM RECHARGEABLE BATTERY, AND SEPARATOR FOR LITHIUM RECHARGEABLE BATTERY

CROSS-REFERENCE TO RELATED APPLICATION AND CLAIM OF PRIORITY

This application makes reference to, incorporates the same herein, and claims all benefits accruing under 35 U.S.C. §119 from an application earlier filed in the Korean Intellectual Property Office on 6 Jul. 2005 and there duly assigned Serial No. 10-2005-0060624.

BACKGROUND OF THE INVENTION

1. Field of the invention

The present invention relates to a lithium rechargeable battery. More particularly, the present invention relates to a lithium rechargeable battery, which includes a separator having excellent mechanical strength, swelling resistance and heat resistance.

2. Description of the Prior Art

Recently, as the portable electronic instruments have been designed to have a low weight and a compact size, a battery used as a drive source for such instruments have been required to have a low weight and a high capacity. Particularly, active and intensive research and development for a lithium rechargeable battery has been conducted, because a lithium rechargeable battery has a drive voltage of 3.6V or higher, which is higher than the drive voltage of a Ni—Cd battery or Ni-MH battery, widely used as a power source for portable electronic instruments, by at least thee times, and provides a higher energy density per unit weight A lithium rechargeable battery generates electric energy by redox reactions occurring upon the lithium ion intercalation/deintercalation in a cathode and an anode. A lithium rechargeable battery is obtained by using a material capable of reversible lithium ion intercalation/deintercalation as a cathode active material and an anode active material and introducing an organic electrolyte or polymer electrolyte between the cathode and the anode.

In general, a lithium rechargeable battery includes an electrode assembly which includes an anode plate, a cathode plate and a separator interposed between both electrode plates and which is wound into a predetermined shape such as a jelly-roll shape, a can for housing the electrode assembly and an electrolyte, and a cap assembly mounted to the top of the can. The cathode plate of the electrode assembly is electrically connected to the cap assembly via a cathode lead, while the anode plate of the electrode assembly is electrically connected to the can via an anode lead.

The separator has its basic function of separating the cathode and the anode from each other so as to prevent a short circuit in a lithium rechargeable battery. Additionally, it is important for the separator to suck an electrolyte necessary for carrying out electrochemical reactions in the battery and to maintain a high ion conductivity. Particularly, in the case of a lithium rechargeable battery, the separator is required to have an additional function to prevent a substance capable of inhibiting the electrochemical reactions from moving within the battery or to ensure the safety of the battery under the abnormal conditions. Generally, the separator includes a microporous polymer membrane based on polyolefin such as polypropylene or polyethylene, or a multilayer membrane including multiple sheets of such membranes. Such conventional separators have a sheet-like or film-like porous membrane layer.

The sheet-like separator has a disadvantage in that the sheet-like separator may shrink while the pores of the porous membrane are blocked, when heat emission occurs by an internal short circuit or an overcharge condition Therefore, if the sheet-like separator is shrink by such internal heat emission of the battery, there is a portion that is not covered by the separator and thus allows the cathode and the anode to be in direct contact with each other, resulting in ignition and explosion of the battery.

The film-like separators ensure the safety of a battery upon heat emission caused by a short circuit via a so-called shutdown action for interrupting lithium ion movement (i.e., current flow) by blocking the pores with a softened polypropylene or polyethylene resin. However, the separators are still disadvantageous when an internal short circuit occurs. For example, in the nail test (penetration), as a substitutive test simulating an internal short circuit condition, heat emission temperature may locally reach several hundred degrees ° C. depending on the test conditions, and thus the porous membrane layer is deformed by the softening or loss of the resin. In addition to this, the test nail penetrates through a cathode and an anode, thereby causing an abnormal overheating phenomenon. Therefore, such means for utilizing the shutdown effect of a resin cannot be an absolute safety means against an internal short circuit.

Additionally, lithium dendrite is formed totally on a film-like separator upon overcharge. This is because there is a gap between an anode and the film-like separator, and thus lithium ions that cannot infiltrate into the anode are accumulated in the gap between the anode and the film, resulting in precipitation of lithium metal. If lithium precipitation occurs over the whole surface of the film, such lithium dendrite penetrates through the film-like separator so that a cathode may be in direct contact with an anode. At the same time, side reactions may occur between lithium metal and an electrolyte to cause heat emission and gas generation, resulting in the ignition and explosion of a battery.

Moreover, such a film-like separator may generate a harder short circuit, because in the event that a polyolefin-based film separator has a portion damaged by the initial heat emission, additional portions adjacent to the damaged portion may be shrink or molten continuously, thereby increasing the area lost by the combustion of the film separator.

SUMMARY OF THE INVENTION

Accordingly, the present invention has been made to solve the above-mentioned problems occurring in the prior art. An object of the present invention is to provide a lithium rechargeable battery, which includes a separator having excellent mechanical strength, swelling resistance and heat resistance.

According to an aspect of the present invention, there is provide a separator including a porous membrane formed of a ceramic material and a binder having an elongation ratio of 200 to 300%.

According to another aspect of the present invention, there is provide a lithium rechargeable battery, which includes: a cathode; an anode; the separator for separating both electrodes from each other, and a non-aqueous electrolyte, wherein the separator includes a porous membrane formed of a ceramic material and a binder, and the binder has an elongation ratio of 200 to 300%.

At least one binder includes an acrylic binder especially a non-crystalline and elastomeric polymer containing polyacrylonitrile units.

The porous membrane may be subjected to a first heat treating step and a second heat treating step performed at a higher temperature than the first heat treating step. The first heat treating step may be performed for 2 to 5 hours and the second heat treating step may be performed for 5 to 20 hours. The heat treating steps may be performed via hot air drying, IR (infrared ray) drying, or VD (vacuum drying).

According to another aspect of the present invention, there is provide a lithium rechargeable battery including: a cathode; an anode; a non-aqueous electrolyte; and a separator separating the cathode and the anode from each other, the separator comprising a porous membrane formed of a ceramic material and a binder, the binder having a swelling degree of 200% or less in the electrolyte.

According to another aspect of the present invention, there is provide a lithium rechargeable battery including: a cathode; an anode; a non-aqueous electrolyte; and a separator separating the cathode and the anode from each other, the separator comprising a porous membrane formed of a ceramic material and a binder, the binder having a heat shrinkage of 0.5% or less at 150° C.

According to another aspect of the present invention, there is provide a lithium rechargeable battery including: a cathode; an anode; a non-aqueous electrolyte; and a separator separating the cathode and the anode from each other, the separator comprising a porous membrane formed of a ceramic material and a binder, the binder comprising acrylic rubber formed by crosslinking a polymer or copolymer of a main acrylic monomer with a crosslinkable comonomer, the main acrylic monomer being at least one monomer selected from the group consisting of: an alkoxyalkyl acrylate selected from among methoxymethyl acrylate, methoxyethyl acrylate, ethoxyethyl acrylate, butoxyethyl acrylate, methoxyethoxyethyl acrylate and dicyclopentenyloxyetyl acrylate; an alkenyl acrylate or alkenyl methacrylate selected from among vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from among divinyl itaconate and divinyl maleate; a vinyl group containing ether selected from among vinyl 1,1-methylpropenyl ether and vinyl 3,3-dimethylbutenyl ether, 1-acryloyloxy-1-phenylethene; and methyl methacrylate, and the crosslinkable comonomer being at least one monomer selected from the group consisting of an alkyl acrylate selected from among 2-ethylhexyl acrylate, methyl acrylate, ethyl acrylate, propyl acrylate, butyl acrylate, octyl acrylate and isooctyl acrylate; an alkenyl chloroacetate selected from among vinyl chloroacetate and acrylchloroacetate; an glycidyl group-containing ester or ether selected from among glycidyl acrylate, vinylglycidyl ether and acrylglycidyl ether, an unsaturated carboxylic acid selected from among acrylic acid, methacrylic acid and maleic acid; 2-chloroethyl vinyl ether, chloromethyl styrene; and acrylonitrile.

According to another aspect of the present invention, there is provide a lithium rechargeable battery including: a cathode; an anode; a non-aqueous electrolyte; and a separator separating the cathode and the anode from each other, the separator comprising a porous membrane formed of a ceramic material and a binder, the porous membrane being a heat-treated porous membrane produced by a first heat-treatment at a first temperature and a second heat-treatment at a second temperature higher than the first temperature.

BRIEF DESCRIPTION OF THE DRAWINGS

A more complete appreciation of the invention and many of the attendant advantages thereof will be readily apparent as the same becomes better understood by reference to the following detailed description when considered in conjunction with the accompanying drawings in which like reference symbols indicate the same or similar components, wherein:

FIG. 1 is a photographic view showing the inorganic oxide layer according to a preferred embodiment of the present invention, observed by FE-TEM after it is cut into a thin film by using FIB (Focused Ion Beams).

DETAILED DESCRIPTION OF THE PREFERRED EMBODIMENTS

The separator according to an embodiment of the present invention includes a porous membrane formed of a ceramic material and a binder. After forming paste by mixing the ceramic material and the binder in a solvent, the porous membrane may be formed on either or both of the cathode and the anode by using the paste. The porous membrane may serve as a film-like separator such as a conventional polyethylene (PE) or polypropylene (PP) separator.

One of the mechanical properties needed for the binder in order to form the porous membrane is flexibility. More particularly, when the porous membrane is formed on either or both of the cathode and the anode and both electrodes are stacked and wound into a jelly-roll shape, the porous membrane should have an elastic strength sufficient for preventing cracking and separation. Such flexibility can be determined by measuring the elongation ratio of the porous membrane. The binder according to an embodiment of the present invention has an elongation ratio ranging from 200% to 300%, and the binder having such a range of elongation ratio is amenable to winding while not causing cracking or separation. The binder used for forming the porous membrane satisfying the above elongation ratio includes a mixture of at least one kind of binder, and at least one of the binders may be an acrylic binder, especially, a noncrystalline and elastomeric polymer containing polyacrylonitrile units Additionally, the binder should not swell when it is impregnated with an electrolyte. That is, the binder should have a sufficient swelling resistance. The swelling resistance of the binder can be determined by measuring the variation in the volume of a binder (i.e. the swelling degree of a binder) in an electrolyte. The binder according to an embodiment of the present invention preferably has a swelling degree of 200% or less in an electrolyte. If the binder does not satisfy the above range of swelling degree, the binder causes severe swelling, resulting in separation of the porous membrane from the surface of an electrode or wrinkling of the porous membrane.

When the paste, obtained by dissolving the ceramic material and the binder in a solvent, is used to form a porous membrane on an electrode, the porous membrane may shrink due to drying or abnormal overheating of a battery, resulting in a hard short. Hence, the binder should have a sufficient shrinking resistance. The shrinking resistance can be determined by measuring the shrinkage of a binder after the binder is stored at high temperature.

The binder according to an embodiment of the present invention preferably has a heat shrinkage of 0.5% or less at 150° C. If the binder does not satisfy the above range of heat shrinkage, the binder may shrink excessively upon overheating of a battery. This is not desirable in terms of safety.

The porous membrane may be formed on an electrode active material layer preliminarily formed on an electrode collector. Thus, the porous membrane should have an excellent level of adhesion to the electrode active material layer. If the adhesion level is low, interfacial separation occurs between the electrode active material layer and the porous membrane layer, when the electrode active material layer experiences a change in its volume so that the porous membrane loses its function. Such adhesion can be determined by measuring peel strength. In order to determine the peel strength more clearly, a porous membrane may be formed on a substrate before measuring the peel strength. In this case, a peel strength of at least 3 gf/mm is required to provide an excellent adhesion while not causing cracking or separation between the electrode active material layer and the porous membrane layer.

The binder that may be used in the present invention includes acrylic rubber having a crosslinked structure. The acrylic rubber having a crosslinked structure may be formed by crosslinking a polymer or copolymer of a main acrylic monomer with a crosslinkable comonomer. If only one kind of the polymer or copolymer of a main acrylic monomer is used, the polymer or copolymer may be easily cleaved due to its weak bonding structure. However, if a crosslinkable monomer is added to the polymer or copolymer of a main acrylic monomer, the crosslinkable monomer is bonded with the polymer or copolymer of a main acrylic monomer, thereby forming a stronger network structure. Such polymers having a network structure cannot be swollen easily in a solvent, as the crosslinking degree increases. The acrylic rubber binder having a crosslinked structure may include a three dimensional crosslinking structure having 2 to 10 crosslinking points, preferably 4 or 5 crosslinking points per unit with a molecular weight of 10,000 in the backbone molecule. Therefore, the acrylic rubber binder having a crosslinked structure according to an embodiment of the present invention shows swelling resistance sufficient to prevent a swelling phenomenon, when it is impregnated with an electrolyte. According to an embodiment of the present invention, at least one binder is a noncrystalline and elastomeric polymer binder containing polyacrylonitrile units.

The ceramic material inherently shows a decomposition temperature of 1000° C. or higher, and the binder includes an acrylic rubber binder having a decomposition temperature of 250° C. or higher. Hence, it is possible to obtain a battery having a high heat resistance, and thus showing a high stability against an internal short.

The main acrylic monomer that may be used in the present invention includes at least one monomer selected from the group consisting of an alkoxyalkyl acrylate selected from among methoxymethyl acrylate, methoxyethyl acrylate, ethoxyethyl acrylate, butoxyethyl acrylate, methoxyethoxyethyl acrylate and dicyclopentenyloxyetyl acrylate; an alkenyl acrylate or alkenyl methacrylate selected from among vinyl methacrylate, vinyl acrylate, allyl methacrylate, 1,1-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from among divinyl itaconate and divinyl maleate; a vinyl group-containing ether selected from among vinyl 1,1-dimethylpropenyl ether and vinyl 3,3-dimethylbutenyl ether, 1-acryloyloxy-1-phenylethene; and methyl methacrylate.

The crosslinkable comonomer that may be used in the present invention includes at least one monomer selected from the group consisting of: an alkyl acrylate selected from among 2-ethylhexyl acrylate, methyl acrylate, ethyl acrylate, propyl acrylate, butyl acrylate, octyl acrylate and isooctyl acrylate; an alkenyl chloroacetate selected from among vinyl chloroacetate and acrylchloroacetate; an glycidyl group-containing ester or ether selected from among glycidyl acrylate, vinylglycidyl ether and acrylglycidyl ether, an unsaturated carboxylic acid selected from among acrylic acid, methacrylic acid and maleic acid; 2-chloroethyl vinyl ether, chloromethyl styrene; and acrylonitrile.

The polymer or copolymer of main acrylic monomer and the crosslinkable comonomer can be used in a weight ratio between 90:10 and 60:40, preferably 70:30. As the content of the polymer or copolymer of main acrylic monomer increases, the binder in the porous membrane formed on a cathode or an anode is softened due to the elastomeric elasticity and softness, and thus shows an improved winding capability. However, if the polymer or copolymer is used in an amount greater than the above range, the resultant battery shows degradation in quality because of an increased swellability to an electrolyte. If the content of the crosslinkable comonomer added to improve crosslinkability is greater than the above range, the binder becomes hardened and has a low softness, and thus shows a poor winding capability.

The polymer or copolymer of main acrylic monomer may have a weight average molecular weight of 10,000 to 5,000,000.

If the side branches of the polymer or copolymer of main acrylic monomer are partially capped with alkali metals such as Na or K and the resultant product is blended with the crosslinkable comonomer, the alkali metals are isolated from the polymer or copolymer before crosslinking, thereby forming an acrylic rubber binder having a crosslinked structure.

For example, when polymethyl methacrylate (PMMA), which is used as the polymer or copolymer of main acrylic monomer, is capped with alkali metals, a part of the ester side branches is present as carboxylated side branches.

In one embodiment of the present invention, a binder having a crosslinked structure is provided by blending 10 wt % of 2-ethylhexyl acrylate with 90 wt % of PMMA having a molecular weight of about 1,000,000, wherein the PMMA has 4 or 5 crosslinking points per unit with a molecular weight of 10,000 so as to improve the lifespan and safety, and is partially capped with alkali metals so as to induce crosslinking. Herein, the alkali metals are isolated from PMMA at 160° C. before crosslinking of the binder. The polymerization of acrylic rubber may be generally performed via suspension polymerization, emulsion polymerization, bulk polymerization, solution polymerization, or the like. Additionally, the polymerization may be performed not only in a continuous system but also in a batch system.

The elongation ratio, the swelling degree and the heat shrinkage of the binder may be adjusted by varying the number of crosslinking points and the molecular length. Otherwise, it is possible to control the size of a molecule surrounding the backbone of the polymer or copolymer of main monomer. For example, the binder shows a decreased swelling degree when it has a smaller molecular length and a greater number of crosslinking points. The binder shows improved flexibility when it has a smaller molecular length. It is also possible to control the swelling degree merely by providing a molecule with a large molecular diameter to the side chains. For example, if the side branch is changed from methyl to a bulky molecule such as butylene, it is possible to control the swelling degree. Such variations in the side branches may be accomplished by changing the main acrylic monomer, for example, from methyl methacrylate to 3,3-dimethyl butenyl methacrylate, or by allowing the binder to react with a butylene-containing compound during an emulsification step in the preparation of the binder. It is possible to obtain a binder having a desired level of swelling degree, heat resistance, electrolyte resistance, voltage resistance and flexibility by adjusting the amount of 2-ethylhexyl acrylate blended with the PMMA material capped with Na at the crosslinking points. Further, when carrying out emulsion polymerization of a binder, Na-capped modified PMMA can be obtained in a mixed NaOH solution. At this time, Na capping amount may be adjusted via the concentration of NaOH, treating temperature, molecular length of PMMA and the number of crosslinking points.

To improve the crosslinkability of the binder, the porous membrane may be subjected to two heat treating steps of a first heat treating step and a second heat treating step, the second heat treating step may be performed at a higher temperature compared to the first heat treating step. According to one embodiment of the present invention, the first heat treating step may be performed for 2 to 5 hours, while the second heat treating step may be performed for 5 to 20 hours. According to another embodiment of the present invention, the ceramic material, the binder and a solvent are mixed to form paste, and then the paste is applied onto either or both of a cathode and an anode. Then, the first heat treating step is performed at 100 to 120° C., and the second heat treating step is performed at a higher temperature compared to the first heat treating step, for example at a temperature of 150 to 200° C. Such heat treatment may be carried out via hot air drying, IR (infrared ray) drying or VD (vacuum drying). According to a preferred embodiment of the present invention, the first heat treating step may be performed via hot air drying or IR drying, and the second heat treating step may be performed via vacuum drying. When the first heat treating step is performed via IR drying, the binder is distributed uniformly over an inorganic oxide layer so that the inorganic oxide layer shows excellent adhesion and flexibility. In the case of hot air drying, hot air is applied onto the top surface of the inorganic oxide layer. Thus, although the top surface may be dried sufficiently, the bottom surface may be dried insufficiently. However, IR drying permits the top surface and the bottom surface of the inorganic oxide layer to be dried simultaneously and sufficiently so that the binder can be distributed uniformly without causing agglomeration. Therefore, if the heat treating step is performed via hot air drying, it is preferable to eliminate a so-called migration phenomenon, in which the binder agglomerates on the top surface of the inorganic oxide layer and migrates upwardly, by controlling the processing conditions such as the temperature, air volume and drying rate.

Therefore, the portion formed by the migration of the binder to the top surface of the inorganic oxide layer (referred to as a migration portion hereinafter) is present preferably in a ratio of at most 50%, more preferably in a ratio of at most 30% based on the area taken by sampling the inorganic oxide layer treated by the first and the second heat treating steps. In other words, if the portion formed by the agglomeration of the binder (migration portion) is present in a ratio of 50% or more based on the sampled area of the inorganic oxide layer, stripes may be formed due to the binder agglomerates when the paste is coated onto an electrode, and the adhesion and flexibility of the inorganic oxide layer may be degraded. The aforementioned migration portion can be observed by FE-TEM (Field Emission Transmission Electron Microscopy) after cutting the section of the inorganic oxide layer by using FIB (Focused Ion Beams) in the form of a thin film.

FIG. 1 shows the inorganic oxide layer according to a preferred embodiment of the present invention, observed by FE-TEM after it is cut into a thin film by using FIB. As can be seen from FIG. 1, the binder is uniformly distributed without causing agglomeration.

According to a preferred embodiment of the present invention, the second heat treating step may be performed via vacuum drying. If the second heat treating step is performed via vacuum drying, the solvent (such as NMP, water, cyclohexanone, or the like) evaporates well in the vacuum state, thereby minimizing the amount of the solvent remaining in the inorganic oxide layer. Additionally, crosslinking of the binder may be facilitated in the vacuum state, compared to drying carried out under the ambient condition at the same temperature.

After the completion of the first heat treating step and the second heat treating step, the amount of the solvent remaining in the inorganic oxide layer is preferably 500 ppm or less, more preferably 300 ppm or less. Due to the two-step heat treatment as described above, it is possible to prevent a porous membrane from cracking and to improve the crosslinkability by facilitating the polymerization of the binder.

In the specification, a primary particle means an individual ceramic particle, and a secondary particle means a granule of aggregated primary particles.

The secondary particles of the ceramic material forming the separator according to an embodiment of the present invention, which are formed by partial sintering or recrystallization of the primary particles of the ceramic material, may be bonded to each other by the binder, thereby forming a porous membrane. The secondary particles of the porous membrane are present preferably in the shape of hexahedral particle clusters (a bunch of grapes) or layered particle clusters. Additionally, the primary particles may also be present in the shape of hexahedral particle clusters or layered particle clusters, wherein scale-like particles are stacked and bonded to each other. Preferably, an individual particle, forming the hexahedral particle clusters or the secondary particles, has a size of 0.01 to 0.3 µm, and an individual scale-like flake, forming the layered particle clusters, has a width of 100 nm to 1 µm. The afore mentioned dimensions of particles can be determined by observing a photograph of a material having good quality, taken by SEM (scanning electron microscopy).

The examples of the ceramic material that may be used in the present invention includes silica ($SiO_2$), alumina ($Al_2O_3$), zirconium oxide ($ZrO_2$), titanium oxide ($TiO_2$), ion conductive glass, or a mixture thereof. Zirconium oxide is preferred.

Other examples of the ceramic materials forming the porous membrane include insulative nitrides, hydroxides or ketones of zirconium, aluminum, silicon or titanium, or combinations thereof Herein, the term "insulative nitride" is used to exclude a conductive nitride such as titanium nitride (TiN) from the scope of the ceramic materials suitable to be used in the present invention.

Zirconium oxide shows excellent dispersibility in terns of the zeta ($\zeta$) potential relationship when mixing and stirring it with an acrylic rubber binder having a crosslinked structure, thereby providing excellent productivity. Also, zirconium oxide is chemically stable and cost efficient. Moreover, zirconium oxide shows excellent heat emission property and forms a good p/n bonding along with a lithium compound at high temperature so that it has diode characteristics. Further, zirconium oxide prevents an excessive amount of lithium ions from being intercalated into an anode.

To form the secondary particles, various chemical and physical methods can be used. For example, the corresponding material is completely dissolved or the surface of the primary particles is partially dissolved by using a chemical substance, followed by recrystallization. Particular examples of the physical methods include application of an external pressure. Among these, an advisable method includes heating the particles to a temperature near the melting point of the particles, followed by necking.

When the particles are partially molten or partially sintered to form particle agglomerates, the ceramic material is molten to such a degree that the resultant porous membrane can have a low density and the unique particle shape can be maintained, while the paste or dispersion for forming the porous membrane is formed by mixing and agitating the ceramic material with the binder and the solvent For example, when the ceramic material (e.g. zirconium oxide) is heated at 900° C. for 10 minutes, a structure of partially sintered particles can be obtained. It is also possible to reprecipitate the ceramic material by dissolving the ceramic material completely by using a solvent providing high solubility to the ceramic material, or by mixing the primary particles with a part of the solvent and removing the solvent.

The ceramic material preferably has a heat expansion ratio of 0.2% or less at 200° C. and a heat expansion ratio of 0.1 to 0.4% at 400° C. If the ceraric material has a heat expansion ratio greater than the above range, it may cause an increase in the internal pressure of a battery, resulting in deformation of the battery.

Preferably, the porous membrane, formed of the ceramic material and the acrylic rubber having a crosslinked structure, has a porosity of at least 50%. Herein, the porosity means the proportion of the vacancy to the total volume of the corresponding object, and represents a degree of pore formation of the corresponding object, like bulk porosity. The porosity can be determined by SEM of the section of the material.

When partially sintered particles are used, particle agglomerates are present randomly so that regular packing in a space, which, otherwise, can be seen in a normal crystal structure, is interrupted. In other words, it is difficult for the filler formed of the ceramic material to be packed in a close and dense state in the space corresponding to the separator. Additionally, it is possible to prevent the acrylic resin from being packed in the interstitial volumes of the particles by reducing the proportion of the resin. In this manner, it is possible to increase the porosity of the separator.

Preferably, the ceramic material used in the present invention has a thermal conductivity of 10 $Wm^{-1}K^{-1}$ at a broad range of temperatures ranging from 500° C. to 1000° C.

Additionally, the ceramic material preferably has a relative permittivity of 1 to 20. If the ceramic material has a relative permittivity greater than 20, it is not possible to provide sufficient capacity. If the ceramic material has a relative permittivity less than 1, it is not possible to form a material having a band gap.

The ceramic material shows a dielectric loss of $10^{-5}$ to $10^{-2}$ at a frequency of 1 MHz. If the dielectric loss is less than $10^{-5}$, it is not possible to obtain a desired band gap due to the low reproducibility and the porous membrane cannot be produced stably. If the dielectric loss is higher than $10^{-2}$, it is not possible to obtain sufficient capacity.

According to an embodiment of the present invention, the porous membrane may be attached onto at least one surface of either or both of the cathode and the anode of a lithium rechargeable battery. Each of the cathode and the anode is obtained by applying an electrode slurry composition which includes an active material, a binder and a conductive agent and which is dispersed in a solvent, onto an electrode collector. To form the porous membrane, the paste for forming the porous membrane is further applied onto the electrode coated with the active material, and then the solvent is removed from the paste applied onto the electrode by way of baking.

The porous membrane may be formed in such a manner that it surrounds the electrode plate. For example, the paste for forming the porous membrane is provided first wherein the paste includes the ceramic material dispersed uniformly in the mixture of the acrylic rubber binder having a crosslinked structure with the solvent. Then, the electrode plate including the active material coated on the electrode collector is dipped into the paste. It is also possible to form the porous membrane by spraying the paste onto the electrode plate.

To form the porous membrane on at least one surface of the cathode surface and the anode surface which face each other, the porous membrane is preferably formed on the outer surface of each electrode, in the case of a jelly-roll type electrode assembly formed by stacking and winding both electrodes. In a variant, it is possible to form the porous membrane on the inner surface of each electrode. In another variant, it is possible to form the porous membrane on the inner surface as well as the outer surface of either of the cathode and the anode.

When the electrode is dipped into the paste for forming the porous membrane, which includes secondary particles of the ceramic material dispersed uniformly in a liquid mixture of the binder and the solvent, the porous membrane may be present on the inner surface, the outer surface and the upper and lower narrow surfaces. Therefore, it is possible to prevent an electric short circuit between the electrode coated with the porous membrane and another electrode.

The porous membrane has a thickness controlled considering the ion conductivity and energy density. Preferably, the porous membrane has a thickness of 1 to 40 µm, more preferably 5 to 20 µm. If the porous membrane has a thickness less than 1 µm, the porous membrane shows a low strength. If the porous membrane has a thickness greater than 40 µm, it is not possible to obtain a desired level of energy density.

According to an embodiment of the present invention, it is preferable to use the acrylic rubber binder having a crosslinked structure in a small amount in the paste or slurry for forming the porous membrane. In the porous membrane according to an embodiment of the present invention, the ceramic material and the binder are used in a weight ratio ranging from 95:5 to 80:20. Under the above range of weight ratio, it is possible to prevent the ceramic material from being totally encapsulated with the binder. In other words, it is possible to prevent the problem of limited ion conduction into the ceramic material, caused by the total encapsulation of the ceramic material with the binder.

After forming the porous membrane on either or both of the cathode and the anode, both electrodes are stacked and wound. Since the porous membrane itself functions as a separator, it is possible to avoid a need for an additional separator between both electrodes. Although conventional film-like separators are shrunk at high temperature, the porous membrane has little possibility of shrinking or melting. As mentioned above, a conventional polyolefin-based film separator may generate a harder short circuit, because it has a portion damaged by the initial heat emission and additional portions adjacent to the damaged portion may be shrunk or molten continuously, thereby increasing the area lost by the combustion of the film separator. However, the electrode having the porous membrane shows a slightly damaged portion at the site where an internal short circuit occurs. Moreover, the electrode having the porous membrane does not allow the short circuit to extend any longer. Additionally, the electrode having the porous membrane does not cause a hard short circuit but a soft short circuit upon overcharge, and thus consumes overcharged current continuously and maintains a constant voltage of 5 to 6V and a battery temperature of 100° C. or less. As a result, it is possible to improve overcharge stability by using the electrode having the porous membrane.

An additional polyolefin-based separator film may be present between both electrodes in a wound electrode assembly, like a conventional lithium rechargeable battery. In this case, both of the porous membrane and the polyolefin-based separator film serve as separators for the resultant rechargeable battery. The polyolefin-based film separator that may be used in the present invention includes a single-layer film of polyethylene or polypropylene, or a multilayer film of polypropylene-polyethylene-polypropylene.

The cathode of the lithium rechargeable battery includes a cathode active material capable of lithium ion intercalation/deintercalation. Preferred cathode active materials that may be used in the present invention include at least one composite oxide containing lithium and at least one element selected from the group consisting of cobalt, manganese and nickel. Typical examples of the cathode active material that may be used preferably in the present invention include the following composite oxides (1) to (13):

$$Li_xMn_{1-y}M_yA_2 \tag{1}$$

$$Li_xMn_{1-y}M_yO_{2-z}X_z \tag{2}$$

$$Li_xMn_2O_{4-z}X_z \tag{3}$$

$$Li_xMn_{2-y}M_yM'_zA_4 \tag{4}$$

$$Li_xCo_{1-y}M_yA_2 \tag{5}$$

$$Li_xCo_{1-y}M_yO_{2-z}X_z \tag{6}$$

$$Li_xNi_{1-y}M_yA_2 \tag{7}$$

$$Li_xNi_{1-y}M_yO_{2-z}X_z \tag{8}$$

$$Li_xNi_{1-y}Co_yO_{2-z}X_z \tag{9}$$

$$Li_xNi_{1-y-z}Co_yM_zA_a \tag{10}$$

$$Li_xNi_{1-y-z}Co_yM_zO_{2-a}X_a \tag{11}$$

$$Li_xNi_{1-y-z}Mn_yM_zA_a \tag{12}$$

$$Li_xNi_{1-y-z}Mn_yM_zO_{2-a}X_a \tag{13}$$

wherein $0.9=x=1.1$; $0=y=0.5$; $0=z=0.5$; $0=a=2$; M and M' are the same or different, and each of M and M' is selected from the group consisting of Mg, Al, Co, K, Na, Ca, Si, Ti, Sn, V, Ge, Ga, B, As, Zr, Mn, Cr, Fe, Sr, V and rare earth elements; A is selected from the group consisting of O, F, S and P; and X is selected from the group consisting of F, S and P.

The anode of the lithium rechargeable battery includes an anode active material capable of lithium ion intercalation/deintercalation. Such anode active materials may include carbonaceous materials such as crystalline carbon, amorphous carbon, carbon composites and carbon fiber, lithium metal and lithium alloys. For example, the amorphous carbon includes hard carbon, cokes, mesocarbon microbead (MCMB) fired at a temperature of 1500° C. or lower, mesophase pitch-based carbon fiber (MPCF), etc. The crystalline carbon includes graphite materials and particular examples thereof include natural graphite, graphitized cokes, graphitized MCMB, graphitized MPCF, etc. Preferably, the carbonaceous material has a d(002) value (interplanar distance) of between 3.35 Å and 3.38 Å, and an Lc value (crystallite size) of at least 20 nm, as measured by X-ray diffraction. Particular examples of the lithium alloys that may be used in the present invention include alloys of lithium with aluminum, zinc, bismuth, cadmium, antimony, silicon, lead, tin, gallium or indium.

The cathode collector that may be used in the present invention includes aluminum or aluminum alloy, while the anode collector that may be used in the present invention includes copper or copper alloy. The cathode collector and the anode collector may take the form of foil, a film, a sheet, a punched body, a porous body or a foamed body.

The cathode and the anode may further comprise a conductive agent in order to improve the conductivity. The conductive agent that may be used in the present invention includes at least one selected from the group consisting of a graphite-based conductive agent, a carbon black-based conductive agent, and a metal- or a metallic compound-based conductive agent. Particular examples of the graphite-based conductive agent include artificial graphite and natural graphite, those of the carbon black-based conductive agent include acetylene black ketjen black, denka black, thermal black and channel black, and those of the metal- or metallic compound-based conductive agent include tin, tin oxide, tin phosphate ($SnPO_4$), titanium oxide, potassium titanate and perovskite substances such as $LaSrCoO_3$ and $LaSrMnO_3$. However, the scope of the present invention is not limited to the above examples. The conductive agent is used preferably in an amount of 0.1 to 10 wt % based on the weight of the cathode active material. If the conductive agent is used in an amount less than 0.1 wt %, electrochemical characteristics may be degraded. On the other hand, if the conductive agent is used in an amount greater than 10 wt %, energy density per unit weight decreases.

The binder for the electrode active material serves to accomplish paste formation of the active material, adhesion of the active material particles and adhesion of the active material to the collector, and provides a buffering effect to swelling and shrinkage of the active material. Particular examples of the binder include polyvinylidene fluoride, polyhexafluoropropylene-polyvinylidene fluoride copolymer (PVDF/HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene, polyvinyl chloride, polyacrylonitrile, polyvinyl pyridine, styrene-butadiene rubber, acrylonitrile-butadiene rubber, or the like. The binder is used in an amount of 0.1 to 30 wt %, preferably in an amount of 1 to 10 wt %, based on the weight of the electrode active material. If the amount of the binder is less than 0.1 wt %, adhesion between the electrode active material and the collector is not sufficient. If the amount of the binder is greater than 30 wt %, adhesion may be improved but it is not possible to obtain a high battery capacity due to the reduced amount of electrode active material.

The solvent for use in dispersing the electrode active material, the binder and the conductive agent includes a non-aqueous solvent or an aqueous solvent. Particular examples of the non-aqueous solvent include N-methyl-2-pyrrolidone (NMP), dimethyl formamide, dimethyl acetamide, N,N-dimethylaminopropylamine, ethylene oxide, tetrahydrofuran, or the like.

When the porous membrane according to an embodiment of the present invention is formed on an anode, it is preferable that the binder used in the porous membrane may be an organic binder, if the binder used in the anode active material is an aqueous binder such as styrene-butadiene rubber. On the other hand, it is preferable that the binder used in the porous membrane may be an aqueous binder, if the binder used in the anode active material is an organic binder such as polyvinylidene fluoride. If the same organic or aqueous binder is used in both of the anode active material layer and the porous membrane, the solvent for dispersing the components of the active material and the porous membrane should be an organic or aqueous solvent in the same manner. In this case, when the paste for forming the porous membrane is coated onto a preformed anode active material layer, the coated and dried anode active material layer may be dissolved back into the solvent for the paste for forming the porous membrane.

When an organic binder is used, the solvent that may be used to provide the paste for forming the porous membrane includes NMP/cyclohexanone (volume ratio=100 to 50:50, preferably 30:70), or other mixed solvents containing cyclohexanone and using isopropyl alcohol, toluene or xylene instead of NMP. When the binder for the anode active material is an organic binder, it is preferable to use an aqueous binder as the binder for forming the paste of the porous membrane and to use water as the solvent for the paste.

The non-aqueous electrolyte for a lithium rechargeable battery includes a lithium salt and a non-aqueous organic solvent. The non-aqueous electrolyte may further include other additives for improving charge/discharge characteristics and for preventing overcharge. The lithium salt serves as a source for supplying lithium ions in a battery and empowers a lithium rechargeable battery to perform basic functions. The non-aqueous organic solvent functions as a medium, through which ions participating in electrochemical reactions in a battery can move.

The lithium salt that may be used in the present invention includes any one salt selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (wherein each of and y represents a natural number), LiCl and LiI, or a mixture containing two or more of them. The lithium salt is used preferably in a concentration of 0.6~2.0M, more preferably in a concentration of 0.7 to 1.6M. If the lithium salt concentration is less than 0.6M, the resultant electrolyte has a low conductivity, resulting in degradation in the quality of the electrolyte. If the lithium salt concentration is greater than 2.0M, the resultant electrolyte has an increased viscosity, resulting in a drop in the lithium ion conductivity.

The non-aqueous organic solvent may include carbonate, ester, ether or ketone alone, or in combination. The organic solvent should have a high dielectric constant (polarity) and low viscosity so as to increase the ion dissociation degree and to facilitate ion conduction. In general, a mixed solvent containing at least two solvents which include a solvent with a high dielectric constant and high viscosity and a solvent with a low dielectric constant and low viscosity is preferred.

Among the non-organic solvents, the carbonate solvent preferably includes a mixed solvent of a cyclic carbonate with a linear carbonate. Particular examples of the cyclic carbonate include ethylene carbonate (EC), propylene carbonate (PC), 1,2-butylene carbonate, 2,3-butylene carbonate, 1,2-pentylene carbonate, 2,3-pentylene carbonate, etc. Ethylene carbonate and propylene carbonate having a high dielectric constant are preferred. When artificial graphite is used as an anode active material, ethylene carbonate is preferred. Particular examples of the linear carbonate include dimethyl carbonate (DMC), diethyl carbonate (DEC), dipropyl carbonate (DPC), methyl propyl carbonate (MPC), ethyl methyl carbonate (EMC), ethyl propyl carbonate (EPC), etc. Among these, dimethyl carbonate, ethyl methyl carbonate and diethyl carbonate having a low viscosity are preferred.

Particular examples of the ester that may be used in the present invention include methyl acetate, ethyl acetate, propyl acetate, methyl propionate, ethyl propionate, γ-butyrlactone (GBL), γ-valerolactone, γ-caprolactone, d-valerolactone, e-caprolactone, etc. Additionally, particular examples of the ether include tetrahydrofuran, 2-methyltetrahydrofuran, dibutyl ether, etc. Particular examples of the ketone that may be used in the present invention include polymethyl vinyl ketone, etc.

Reference will now be made in detail to the preferred embodiments of the present invention. It is to be understood that the following examples are illustrative only, and the scope of the present invention is not limited thereto.

Winding Characteristics Depending on Elongation Ratio of Binder

Comparative Examples 1 to 3 and Examples 1 to 5

Artificial graphite as an anode active material, styrene-butadiene rubber as a binder and carboxymethyl cellulose as a thickening agent were mixed in a weight ratio of 96:2:2, and the resultant mixture was dispersed into water to provide anode active material slurry. The slurry was coated on copper foil with a thickness of 15 μm, followed by drying, and the coated copper foil was rolled to provide an anode.

Next, 96 wt % of secondary particles of zirconium oxide ($ZrO_2$) as a ceramic material was mixed with 4 wt % of acrylic rubber based on polymethyl methacrylate (PMMA) and having the elongation ratio as shown in the following Table 1. Then, the mixture was diluted with a mixed solvent of N-methyl-2-pyrrolidone/cyclohexanone (weight ratio=3:7) to a viscosity of about 1000 to 3000 cps to provide a mixed solution. The above anode plate was dipped into the mixed solution, and the thickness of the dip coated layer was controlled by using a gravure roller. The coated anode was heat treated via a first heat treating step at 120° C. for 5 hours and a second heat treating step at 150° C. for 5 hours, thereby forming a porous membrane on the anode to a thickness of 10 μm.

Experimental Example 1

Test of Winding Characteristics

The elongation ratio of a binder is determined by measuring how the binder can extend without causing snap-off on the basis of the initial length of the binder, when the binder is drawn after the polymerization thereof. That is, elongation ratio=$(\Delta l/l_0)*100\%$, wherein $\Delta l$ means elongation length and $l_0$ means the initial length.

Each of the anodes having a porous membrane, obtained according to Comparative Examples 1 to 3 and Examples 1 to 5, was wound into a jelly-roll shape.

TABLE 1

| | elongation ratio of binder | condition of electrode plate | winding |
|---|---|---|---|
| Comp. Ex. 1 | 125% | cracking | not available |
| Comp. Ex. 2 | 150% | cracking | not available |
| Comp. Ex. 3 | 175% | cracking | not available |
| Ex. 1 | 200% | no cracking | available |
| Ex. 2 | 225% | no cracking | available |
| Ex. 3 | 250% | no cracking | available |
| Ex. 4 | 275% | no cracking | available |
| Ex. 5 | 300% | no cracking | available |

As can be seen from Table 1, an elongation ratio ranging from 200% to 300% allows winding of an anode. If a binder has an elongation ratio less than 200%, the anode using the porous membrane including the binder cannot be wound, because the anode plate is cracked at the folded portions when winding the anode having the porous membrane.

Flexibility Depending on Type of Binder

Comparative Examples 4 to 9 and Examples 6 to 9

A porous membrane was formed on an anode plate in the same manner as Comparative Example 1, except that 97 wt % of powder of alumina ($Al_2O_3$) particles were used as a ceramic material and the binder as shown in the following Table 2 was used to provide a mixed solution of inorganic oxide, and a layer of inorganic oxide was formed on the anode plate to a thickness of 30 μm.

Experimental Example 2

Test of Flexibility

Each of the electrode plates according to Comparative Examples 4 to 9 and Examples 6 to 9 was wound around a cylindrical bar having a diameter ranging from 1 mmF to 5 mmF with an interval of 0.5 mm, and was determined whether any cracking occurred or not by using a microscope. Herein, as the diameter of a cylindrical bar, which causes cracking, decreases, the electrode plate has higher flexibility.

TABLE 2

|  | type of binder (3 wt %) | winding test |
| --- | --- | --- |
| Comp. Ex. 4 | PVDF (Polyvinylidene fluoride) | cracking @ 4.5 mmF |
| Comp. Ex. 5 | SBR (Styrene-butadiene rubber) | cracking @ 4.0 mmF |
| Comp. Ex. 6 | Methoxymethylacrylate | cracking @ 3.0 mmF |
| Comp. Ex. 7 | Metoxyethylacrylate | cracking @ 3.5 mmF |
| Comp. Ex. 8 | Etoxyethylacrylate | cracking @ 3.0 mmF |
| Comp. Ex. 9 | Butoxyethylacrylate | cracking @ 3.5 mmF |
| Ex. 6 | Polymer blend of Acrylonitrile + Metoxymethylacrylate | cracking @ 1.5 mmF |
| Ex. 7 | Polymer blend of Acrylonitrile + Metoxyethylacrylate | cracking @ 1.5 mmF |
| Ex. 8 | Polymer blend of Acrylonitrile + Etoxyethylacrylate | cracking @ 2.5 mmF |
| Ex. 9 | Polymer blend of Acrylonitrile + Butoxyethylacrylate | cracking @ 2.0 mmF |

As can be seen from Table 2, an acrylic rubber-based binder provides excellent flexibility. Particularly, a binder containing acrylonitrile units provides more excellent flexibility.

Peel Strength of Porous Membrane after Heat Treatment

Comparative Example 10

An acrylic rubber-based binder was prepared by mixing 10 wt % of 2-ethylhexyl acrylate, 90 wt % of polymethyl methacrylate having a molecular weight of 1,000,000 and sodium hydroxide (5 to 10 wt % based on the weight of the mixed acrylate), followed by crosslinking at 160° C. Next, 96 wt % of powder of secondary particles of zirconium oxide ($ZrO_2$) as a ceramic material was mixed with 4 wt % of the acrylic rubber binder. Then, the mixture was diluted with a mixed solvent of N-methyl-2-pyrrolidone/cyclohexanone (weight ratio=3:7) to a viscosity of about 3000 cps to provide a mixed solution. Copper foil was dipped into the mixed solution, and the thickness of the coating layer was controlled by using a gravure roller. The coated copper foil was heat treated via IR drying at 100° C. for 10 hours to allow the solvent to evaporate.

Comparative Examples 11 to 13

Comparative Example 10 was repeated, except that the heat treating temperature was varied as shown in the following Table 3.

Examples 10 to 15

Comparative Example 10 was repeated, except that a fist heat treating step was performed via IR drying at 100 to 120° C. for 5 hours and a second heat treating step was further carried out via vacuum drying at 150 to 200° C. for 5 hours, as shown in Table 3.

Experimental Example 3

Measurement of Peel Strength

Although a porous membrane was formed on an anode or a cathode, a porous membrane was formed on copper foil, and then the adhesion of the porous membrane to the copper foil was measured in terms of 180° peel strength so as to determine the peel strength of the porous membrane more clearly. Each copper foil according to Comparative Examples 10 to 13 and Examples 10 to 15 was cut into a size of 25.4 mm×100 mm (width×length) by using a steel ruler. The sample was fixed to a holder and the 180° peel strength was measured by using a tensile strength tester (Hounsfield test equipment, serial No. 0050 model RC). The test was carried out at a drawing rate of 100 mm/min. to an elongated length of 25 to 50 mm.

TABLE 3

|  | $1^{st}$ heat treating step (□) | $2^{nd}$ heat treating step (□) | Cracking | peel strength (gf/mm) |
| --- | --- | --- | --- | --- |
| Comp. Ex. 10 | 100 | — | No | 1.02 |
| Comp. Ex. 11 | 120 | — | no | 1.15 |
| Comp. Ex. 12 | 150 | — | yes | 1.87 |
| Comp. Ex. 13 | 200 | — | yes | 1.76 |
| Ex. 10 | 100 | 150 | no | 2.88 |
| Ex. 11 | 100 | 170 | no | 3.09 |
| Ex. 12 | 100 | 200 | no | 3.28 |
| Ex. 13 | 120 | 150 | no | 3.17 |
| Ex. 14 | 120 | 170 | no | 3.39 |
| Ex. 15 | 120 | 200 | no | 3.28 |

As shown in Table 3, Comparative Examples 10 and 11, using a first heat treating step at 100 to 120° C. with no second heat treating step, cause no cracking of the porous membranes. However, Comparative Examples 10 and 11 shows a low peel strength because the binder cannot reach such a temperature that polymerization occurs sufficiently. In the case of Comparative Example 12 or 13, peel strength can be improved at a high temperature of 150 to 200° C. However, the porous membranes according to Comparative Examples 12 and 13 are cracked due to the instantaneous evaporation of the solvent.

According to Examples 10 to 15, solvent evaporation is allowed at a relatively low temperature of 100 to 120° C., and then a binder is polymerized at a high temperature of 150 to 200° C. By doing so, it is possible to prevent the porous membrane from cracking, to perform the polymerization of the binder to a sufficient degree, and to improve the crosslinkability.

Battery Thickness Depending on Swelling Degree of Binder

Comparative Examples 14 to 16 and Examples 16 to 19

$LiCoO_2$ as a cathode active material, polyvinylidene fluoride as a binder and carbon as a conductive agent were mixed in a weight ratio of 92:4:4, and the resultant mixture was dispersed into N-methyl-2-pyrrolidone to provide cathode slurry. The slurry was coated onto aluminum foil with a thickness of 20 μm, and the coated Al foil was dried and rolled to provide a cathode. Artificial graphite as an anode active material, styrene-butadiene rubber as a binder and carboxymethyl cellulose as a thickening agent were mixed in a weight ratio of 96:2:2, and the resultant mixture was dispersed into water to provide anode active material slurry. The slurry was coated on copper foil with a thickness of 15 μm, followed by drying and the coated copper foil was rolled to provide an anode.

Next, 96 wt % of secondary particles of zirconium oxide ($ZrO_2$) as a ceramic material was mixed with 4 wt % of acrylic rubber based on polymethyl methacrylate (PMMA) and having the swelling degree as shown in the following Table 4. Then, the mixture was diluted with a mixed solvent of N-methyl-2-pyrrolidone/cyclohexanone (weight ratio=3:7) to a viscosity of about 1000 to 3000 cps to provide a mixed solution. The above anode plate was dipped into the mixed solution, and the thickness of the dip coated layer was controlled by using a gravure roller. The coated anode was heat treated via a first heat treating step at 120° C. for 5 hours and a second heat treating step at 150° C. for 5 hours, thereby forming a porous membrane on the anode to a thickness of 10 μm.

The electrodes obtained as described above were wound and compressed, before inserting them into a prismatic can. An electrolyte was injected into the can to provide a lithium rechargeable battery. Herein, the electrolyte was a mixed solution of ethylene carbonate/ethylmethyl carbonate (volume ratio=3:7) containing 1.3M $LiPF_6$ dissolved therein.

Experimental Example 4

Measurement of Battery Thickness Depending on Swelling Degree of Binder

Each binder was applied onto aluminum foil in a rectangular form, and the longitudinal length, transverse length and the thickness were measured to calculate the initial volume. Then, the binder was introduced into an electrolyte including a mixed solution of ethylene carbonate/ethylmethyl carbonate (volume ratio=50:50) containing 1.3M $LiPF_6$ dissolved therein, and was stored in a chamber at 60° C. for 1 day. The binder was measured for its variation in the volume after the swelling caused by the electrolyte. Herein, a swelling degree is calculated by the formula of (volume gain/initial volume)× 100%.

Each of the lithium rechargeable batteries according to Comparative Examples 14 to 16 and Examples 16 to 19 was measured for its thickness after it is fully charged. Thickness of each battery was expressed in percentage terms based on the thickness (100%) of a battery using a binder having a swelling degree of 125%.

It can be seen from the above results that a binder having a swelling degree of 200% or less is available, considering the thickness specification acceptable by general battery producers.

TABLE 4

|  | swelling degree of binder | battery thickness |
|---|---|---|
| Comp. Ex. 14 | 225% | 140% |
| Comp. Ex. 15 | 250% | 146% |
| Comp. Ex. 16 | 275% | 155% |
| Ex. 16 | 125% | 100% |

TABLE 4-continued

|  | swelling degree of binder | battery thickness |
|---|---|---|
| Ex. 17 | 150% | 103% |
| Ex. 18 | 175% | 107% |
| Ex. 19 | 200% | 111% |

Separation Characteristics of Porous Membrane Depending on Heat Shrinkage of Binder $LiCoO_2$ as a cathode active material, polyvinylidene fluoride as a binder and carbon as a conductive agent were mixed in a weight ratio of 92:4:4, and the resultant mixture was dispersed into N-methyl-2-pyrrolidone to provide cathode slurry. The slurry was coated onto aluminum foil with a thickness of 20 μm, and the coated Al foil was dried and rolled to provide a cathode. Artificial graphite as an anode active material, styrene-butadiene rubber as a binder and carboxymethyl cellulose as a thickening agent were mixed in a weight ratio of 96:2:2, and the resultant mixture was dispersed into water to provide anode active material slurry. The shiny was coated on copper foil with a thickness of 15 μm, followed by drying, and the coated copper foil was rolled to provide an anode.

Next, 96 wt % of secondary particles of zirconium oxide ($ZrO_2$) as a ceramic material was mixed with 4 wt % of acrylic rubber based on polymethyl methacrylate (PMMA) and having the heat shrinkage as shown in the following Table 5. Then, the mixture was diluted with a mixed solvent of N-methyl-2-pyrrolidone/cyclohexanone (weight ratio=3:7) to a viscosity of about 1000 to 3000 cps to provide a mixed solution. The cathode plate and the anode plate were dipped into the mixed solution, and the thickness of the dip coated layer was controlled by using a gravure roller. The coated electrodes were heat treated via a first heat treating step at 120° C. for 5 hours and a second heat treating step at 150° C. for 5 hours, thereby forming a porous membrane on each of the cathode and the anode to a thickness of 10 μm.

Experimental Example 5

Determination of Separation Characteristics of Porous Membrane Depending on Heat Shrinkage of Binder The heat shrinkage of a binder was measured by pouring the binder into a frame having a predetermined area (longitudinal length×transverse length) to form a rectangular shape, storing the formed binder in an oven at 150° C. for 24 hours, and measuring the degree of shrinkage. The heat shrinkage was expressed in percentage terms based on the initial area (longitudinal length×transverse length), taken as 100%

Each of the cathodes and the anodes according to Examples 20 to 24 and Comparative Examples 17 to 20 was observed whether each porous membrane was separated from the electrode or not.

TABLE 5

|  | heat shrinkage of binder(150□) | separation of porous membrane |
|---|---|---|
| Comp. Ex. 17 | 0.6% | Yes |
| Comp. Ex. 18 | 0.7% | Yes |
| Comp. Ex. 19 | 0.8% | Yes |
| Comp. Ex. 20 | 0.9% | Yes |

TABLE 5-continued

|  | heat shrinkage of binder(150□) | separation of porous membrane |
|---|---|---|
| Ex. 20 | 0.1% | No |
| Ex. 21 | 0.2% | No |
| Ex. 22 | 0.3% | No |
| Ex. 23 | 0.4% | No |
| Ex. 24 | 0.5% | No |

As can be seen from Table 5, it is preferable to use a binder having a low heat shrinkage (i.e. area loss ΔS=0.5% or less), so as to prevent separation of the anode active material or the cathode active material adhered to the underlying substrate via the stress of the binder used in the porous membrane.

As can be seen from the foregoing, a lithium rechargeable battery including a separator having excellent mechanical strength, swelling resistance, shrinking resistance and heat resistance, can be provided according to the present invention. Therefore, the separator according to the present invention can improve the safety of a lithium rechargeable battery.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A lithium rechargeable battery, comprising:
a cathode;
an anode;
a separator separating the cathode and the anode from each other, the separator comprising a porous membrane formed of a ceramic material and a binder, the binder having an elongation ratio of 200 to 300%; and
a non-aqueous electrolyte, wherein
the porous membrane has a porosity of at least 50%; and
the binder consists of an acrylic rubber formed by crosslinking a polymer or copolymer of a main acrylic monomer with a crosslinkable monomer;
the main acrylic monomer comprising at least one monomer selected from the group consisting of an alkoxyalkyl acrylate selected from among methoxymethyl acrylate, methoxyethyl acrylate, ethoxyethyl acrylate, butoxyethyl acrylate, methoxyethoxyethyl acrylate and dicyclopentenyloxyetyl acrylate; an alkenyl acrylate or alkenyl methacrylate selected from among vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from among divinyl itaconate and divinyl maleate; a vinyl group-containing ether selected from among vinyl 1,1-dimethylpropenyl ether and vinyl 3,3-dimethylbutenyl ether; 1-acryloyloxy-1-phenylethene; and methyl methacrylate; and
the crosslinkable monomer comprising at least one selected from the group consisting of an alkyl acrylate selected from among 2-ethylhexyl acrylate, methyl acrylate, ethyl acrylate, propyl acrylate, butyl acrylate, octyl acrylate and isooctyl acrylate; an alkenyl chloroacetate selected from among vinyl chloroacetate and acrylchloroacetate; an glycidyl group-containing ester or ether selected from among glycidyl acrylate, vinylglycidyl ether and acrylglycidyl ether; an unsaturated carboxylic acid selected from among acrylic acid, methacrylic acid and maleic acid; 2-chloroethyl vinyl ether; chloromethyl styrene; and acrylonitrile;
the polymer or the copolymer is mixed with the crosslinkable monomer in a weight ratio ranging from 90:10 to 60:40; and
the ceramic material is secondary particles; the secondary particles are formed of primary particles; and the primary particles are scale-like flakes having a width of 100 nm to 1.0 μm.

2. The lithium rechargeable battery as claimed in claim 1, wherein the binder is a noncrystalline and elastomeric polymer including at least one polyacrylonitrile unit.

3. The lithium rechargeable battery as claimed in claim 1, wherein the porous membrane is a heat-treated porous membrane produced by two heat treating steps of a first heat-treatment and a second heat-treatment, the second heat-treatment being performed at a higher temperature than the first temperature.

4. The lithium rechargeable battery as claimed in claim 3, wherein the first heat-treatment is performed at the first temperature of 100 to 120° C. for 2 to 5 hours and the second heat-treatment is performed at the second temperature of 150 to 200° C. for 5 to 20 hours.

5. The lithium rechargeable battery as claimed in claim 3, wherein the first heat-treatment is infrared ray drying, and the second heat-treatment is vacuum drying.

6. The lithium rechargeable battery as claimed in claim 1, wherein the binder has a swelling degree of 200% or less in the electrolyte.

7. The lithium rechargeable battery as claimed in claim 1, wherein the binder has a heat shrinkage of 0.5% or less at 150° C.

8. The lithium rechargeable battery as claimed in claim 1, wherein the porous membrane has a peel strength of 3 gf/mm or higher.

9. The lithium rechargeable battery as claimed in claim 1, wherein the acrylic rubber includes a three dimensional crosslinking structure having 2 to 10 crosslinking points per unit.

10. The lithium rechargeable battery as claimed in claim 1, wherein the polymer or copolymer of the main acrylic monomer has a weight average molecular weight of 10,000 to 5,000,000.

11. A lithium rechargeable battery as claimed in claim 1, wherein the porous membrane is formed by bonding secondary particles of the ceramic material, obtained by sintering or recrystallizing primary particles of the ceramic material, with the binder.

12. A lithium rechargeable battery as claimed in claim 11, wherein the primary particles and the secondary particles include hexahedral particle clusters or layered particle clusters.

13. A lithium rechargeable battery as claimed in claim 12, wherein the primary particles having the form of hexahedral particle clusters have a diameter of 0.01 to 0.3 μm.

14. A lithium rechargeable battery as claimed in claim 12, wherein the primary particles having the form of layered particle clusters include scale-like flakes having a width of 100 nm to 1 μm.

15. The lithium rechargeable battery as claimed in claim 1, wherein the ceramic material is at least one material selected from the group consisting of silica ($SiO_2$), alumina ($Al_2O_3$), zirconium oxide ($ZrO_2$), and titanium oxide ($TiO_2$).

16. A lithium rechargeable battery as claimed in claim 1, wherein the ceramic material is at least one material selected from the group consisting of insulative nitrides, hydroxides and ketones of each of zirconium, aluminum, silicon and titanium.

17. The lithium rechargeable battery as claimed in claim 1, wherein the ceramic material and the binder are used in a weight ratio ranging from 95:5 to 80:20.

18. The lithium rechargeable battery as claimed in claim 1, wherein the separator further includes an additional polyolefin-based resin film.

19. The lithium rechargeable battery as claimed in claim 18, wherein the polyolefin-based resin film is selected from the group consisting of a single-layer film of polyethylene, a single-layer film of polypropylene and a multilayer film of polypropylene-polyethylene-polypropylene.

20. The lithium rechargeable battery as claimed in claim 1, wherein the separator consists essentially of the porous membrane.

21. The lithium rechargeable battery as claimed in claim 1, wherein the porous membrane is formed on at least one of the cathode and the anode.

22. The lithium rechargeable battery as claimed in claim 1, wherein the porous membrane has a thickness of 1 to 40 µm.

23. A separator for a lithium rechargeable battery, comprising:
   a porous membrane comprising:
   a ceramic material; and
   a binder having an elongation ratio of 200 to 300%, and wherein
   the porous membrane has a porosity of at least 50%; and
   the binder consists of an acrylic rubber formed by crosslinking a polymer or copolymer of a main acrylic monomer with a crosslinkable monomer;
      the main acrylic monomer comprising at least one monomer selected from the group consisting of an alkoxyalkyl acrylate selected from among methoxymethyl acrylate, methoxyethyl acrylate, ethoxyethyl acrylate, butoxyethyl acrylate, methoxyethoxyethyl acrylate and dicyclopentenyloxyetyl acrylate; an alkenyl acrylate or alkenyl methacrylate selected from among vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from among divinyl itaconate and divinyl maleate; a vinyl group-containing ether selected from among vinyl 1,1-dimethylpropenyl ether and vinyl 3,3-dimethylbutenyl ether; 1-acryloyloxy-1-phenylethene; and methyl methacrylate; and
      the crosslinkable monomer comprising at least one selected from the group consisting of an alkyl acrylate selected from among 2-ethylhexyl acrylate, methyl acrylate, ethyl acrylate, propyl acrylate, butyl acrylate, octyl acrylate and isooctyl acrylate; an alkenyl chloroacetate selected from among vinyl chloroacetate and acrylchloroacetate; an glycidyl group-containing ester or ether selected from among glycidyl acrylate, vinylglycidyl ether and acrylglycidyl ether; an unsaturated carboxylic acid selected from among acrylic acid, methacrylic acid and maleic acid; 2-chloroethyl vinyl ether; chloromethyl styrene; and acrylonitrile; and
   the polymer or the copolymer is mixed with the crosslinkable monomer in a weight ratio ranging from 90:10 to 60:40; and the ceramic material is secondary particles; the secondary particles are formed of primary particles; and the primary particles are scale-like flakes having a width of 100 nm to 1.0 µm.

24. The separator as claimed in claim 23, wherein the binder has a swelling degree of 200% or less in an electrolyte.

25. The separator as claimed in claim 23, wherein the binder has a heat shrinkage of 0.5% or less at 150° C.

26. A separator for a lithium rechargeable battery, comprising:
   a heat-treated porous membrane produced by a first heat-treatment at a first temperature and a second heat-treatment at a second temperature higher than the first temperature, the heat-treated porous membrane comprising:
   a ceramic material; and
   a binder consists of an acrylic rubber formed by crosslinking a polymer or copolymer of a main acrylic monomer with a crosslinkable monomer, the main acrylic monomer comprising at least one monomer selected from the group consisting of an alkoxyalkyl acrylate selected from among methoxymethyl acrylate, methoxyethyl acrylate, ethoxyethyl acrylate, butoxyethyl acrylate, methoxyethoxyethyl acrylate and dicyclopentenyloxyetyl acrylate; an alkenyl acrylate or alkenyl methacrylate selected from among vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from among divinyl itaconate and divinyl maleate; a vinyl group-containing ether selected from among vinyl 1,1-dimethylpropenyl ether and vinyl 3,3-dimethylbutenyl ether; 1-acryloyloxy-1-phenylethene; and methyl methacrylate, and the crosslinkable monomer comprising at least one selected from the group consisting of an alkyl acrylate selected from among 2-ethylhexyl acrylate, methyl acrylate, ethyl acrylate, propyl acrylate, butyl acrylate, octyl acrylate and isooctyl acrylate; an alkenyl chloroacetate selected from among vinyl chloroacetate and acrylchloroacetate; an glycidyl group-containing ester or ether selected from among glycidyl acrylate, vinylglycidyl ether and acrylglycidyl ether; an unsaturated carboxylic acid selected from among acrylic acid, methacrylic acid and maleic acid; 2-chloroethyl vinyl ether; chloromethyl styrene; and acrylonitrile, and wherein
   the porous membrane has a porosity of at least 50%; and
   the polymer or the copolymer is mixed with the crosslinkable monomer in a weight ratio ranging from 90:10 to 60:40; and
   the ceramic material is secondary particles; the secondary particles are formed of primary particles; and the primary particles are scale-like flakes having a width of 100 nm to 1.0 µM.

27. A lithium rechargeable battery, comprising:
   a cathode;
   an anode;
   a non-aqueous electrolyte; and
   a separator separating the cathode and the anode from each other, the separator comprising a porous membrane formed of a ceramic material and a binder, the binder having a swelling degree of 200% or less in the electrolyte, wherein
   the porous membrane has a porosity of at least 50%; and the binder consists of an acrylic rubber formed by crosslinking a polymer or copolymer of a main acrylic monomer with a crosslinkable monomer;

the main acrylic monomer comprising at least one monomer selected from the group consisting of an alkoxyalkyl acrylate selected from among methoxymethyl acrylate, methoxyethyl acrylate, ethoxyethyl acrylate, butoxyethyl acrylate, methoxyethoxyethyl acrylate and dicyclopentenyloxyetyl acrylate; an alkenyl acrylate or alkenyl methacrylate selected from among vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from among divinyl itaconate and divinyl maleate; a vinyl group-containing ether selected from among vinyl 1,1-dimethylpropenyl ether and vinyl 3,3-dimethylbutenyl ether; 1-acryloyloxy-1-phenylethene; and methyl methacrylate; and the crosslinkable monomer comprising at least one selected from the group consisting of an alkyl acrylate selected from among 2-ethylhexyl acrylate, methyl acrylate, ethyl acrylate, propyl acrylate, butyl acrylate, octyl acrylate and isooctyl acrylate; an alkenyl chloroacetate selected from among vinyl chloroacetate and acrylchloroacetate; an glycidyl group-containing ester or ether selected from among glycidyl acrylate, vinylglycidyl ether and acrylglycidyl ether; an unsaturated carboxylic acid selected from among acrylic acid, methacrylic acid and maleic acid; 2-chloroethyl vinyl ether; chloromethyl styrene; and acrylonitrile; and the polymer or the copolymer is mixed with the crosslinkable monomer in a weight ratio ranging from 90:10 to 60:40; and the ceramic material is secondary particles; the secondary particles are formed of primary particles; and the primary particles are scale-like flakes having a width of 100 nm to 1.0 μm.

28. A lithium rechargeable battery, comprising:
a cathode;
an anode;
a non-aqueous electrolyte; and
a separator separating the cathode and the anode from each other, the separator comprising a porous membrane formed of a ceramic material and a binder, the binder having a heat shrinkage of 0.5% or less at 150° C., the porous membrane being a heat-treated porous membrane produced by a first heat-treatment at a first temperature and a second heat-treatment at a second temperature higher than the first temperature, wherein the porous membrane has a porosity of at least 50%; and
the binder consists of an acrylic rubber formed by crosslinking a polymer or copolymer of a main acrylic monomer with a crosslinkable monomer;

the main acrylic monomer comprising at least one monomer selected from the group consisting of an alkoxyalkyl acrylate selected from among methoxymethyl acrylate, methoxyethyl acrylate, ethoxyethyl acrylate, butoxyethyl acrylate, methoxyethoxyethyl acrylate and dicyclopentenyloxyetyl acrylate; an alkenyl acrylate or alkenyl methacrylate selected from among vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from among divinyl itaconate and divinyl maleate; a vinyl group-containing ether selected from among vinyl 1,1-dimethylpropenyl ether and vinyl 3,3-dimethylbutenyl ether; 1-acryloyloxy-1-phenylethene; and methyl methacrylate; and the crosslinkable monomer comprising at least one selected from the group consisting of an alkyl acrylate selected from among 2-ethylhexyl acrylate, methyl acrylate, ethyl acrylate, propyl acrylate, butyl acrylate, octyl acrylate and isooctyl acrylate; an alkenyl chloroacetate selected from among vinyl chloroacetate and acrylchloroacetate; an glycidyl group-containing ester or ether selected from among glycidyl acrylate, vinylglycidyl ether and acrylglycidyl ether; an unsaturated carboxylic acid selected from among acrylic acid, methacrylic acid and maleic acid; 2-chloroethyl vinyl ether; chloromethyl styrene; and acrylonitrile; and the polymer or the copolymer is mixed with the crosslinkable monomer in a weight ratio ranging from 90:10 to 60:40; and the ceramic material is secondary particles; the secondary particles are formed of primary particles; and the primary particles are scale-like flakes having a width of 100 nm to 1.0 μM.

29. A lithium rechargeable battery, comprising:
a cathode;
an anode;
a non-aqueous electrolyte; and
a separator separating the cathode and the anode from each other, the separator comprising a porous membrane formed of a ceramic material and a binder, the porous membrane being a heat-treated porous membrane produced by a first heat-treatment at a first temperature and a second heat-treatment at a second temperature higher than the first temperature, wherein the porous membrane has a porosity of at least 50%; and
the binder consists of an acrylic rubber formed by crosslinking a polymer or copolymer of a main acrylic monomer with a crosslinkable monomer;

the main acrylic monomer comprising at least one monomer selected from the group consisting of an alkoxyalkyl acrylate selected from among methoxymethyl acrylate, methoxyethyl acrylate, ethoxyethyl acrylate, butoxyethyl acrylate, methoxyethoxyethyl acrylate and dicyclopentenyloxyetyl acrylate; an alkenyl acrylate or alkenyl methacrylate selected from among vinyl methacrylate, vinyl acrylate, allyl methacrylate, 1,1,-dimethylpropenyl methacrylate, 1,1-dimethylpropenyl acrylate, 3,3-dimethylbutenyl methacrylate and 3,3-dimethylbutenyl acrylate; an unsaturated dicarboxylic acid ester selected from among divinyl itaconate and divinyl maleate; a vinyl group-containing ether selected from among vinyl 1,1-dimethylpropenyl ether and vinyl 3,3-dimethylbutenyl ether; 1-acryloyloxy-1-phenylethene; and methyl methacrylate; and the crosslinkable monomer comprising at least one selected from the group consisting of an alkyl acrylate selected from among 2-ethylhexyl acrylate, methyl acrylate, ethyl acrylate, propyl acrylate, butyl acrylate, octyl acrylate and isooctyl acrylate; an alkenyl chloroacetate selected from among vinyl chloroacetate and acrylchloroacetate; an glycidyl group-containing ester or ether selected from among glycidyl acrylate, vinylglycidyl ether and acrylglycidyl ether;

an unsaturated carboxylic acid selected from among acrylic acid, methacrylic acid and maleic acid; 2-chloroethyl vinyl ether; chloromethyl styrene; and acrylonitrile; and the polymer or the copolymer is mixed with the crosslinkable monomer in a weight ratio ranging from 90:10 to 60:40; and the ceramic material is secondary particles; the secondary particles are formed of primary particles; and the primary particles are scale-like flakes having a width of 100 nm to 1.0 μm.

30. The lithium rechargeable battery as claimed in claim 1, wherein the polymer or the copolymer are polymethyl methacrylate (PMMA), polyvinylidene fluoride (PVDF), styrene-butadiene rubber (SBR), methoxymethylacrylate, metoxyethylacrylate, etoxyethylacrylate, and butoxyethylacrylate.

31. The separator as claimed in claim 23, wherein the polymer or the copolymer are polymethyl methacrylate (PMMA), polyvinylidene fluoride (PVDF), styrene-butadiene rubber (SBR), methoxymethylacrylate, metoxyethylacrylate, etoxyethylacrylate, and butoxyethylacrylate.

32. The separator for a lithium rechargeable battery as claimed in claim 26, wherein the polymer or the copolymer are polymethyl methacrylate (PMMA), polyvinylidene fluoride (PVDF), styrene-butadiene rubber (SBR), methoxymethylacrylate, metoxyethylacrylate, etoxyethylacrylate, and butoxyethylacrylate.

33. The lithium rechargeable battery as claimed in claim 27, wherein the polymer or the copolymer are polymethyl methacrylate (PMMA), polyvinylidene fluoride (PVDF), styrene-butadiene rubber (SBR), methoxymethylacrylate, metoxyethylacrylate, etoxyethylacrylate, and butoxyethylacrylate.

34. The lithium rechargeable battery as claimed in claim 28, wherein the polymer or the copolymer are polymethyl methacrylate (PMMA), polyvinylidene fluoride (PVDF), styrene-butadiene rubber (SBR), methoxymethylacrylate, metoxyethylacrylate, etoxyethylacrylate, and butoxyethylacrylate.

35. The lithium rechargeable battery as claimed in claim 29, wherein the polymer or the copolymer are polymethyl methacrylate (PMMA), polyvinylidene fluoride (PVDF), styrene-butadiene rubber (SBR), methoxymethylacrylate, metoxyethylacrylate, etoxyethylacrylate, and butoxyethylacrylate.

* * * * *